US008676702B1

(12) United States Patent
Croak et al.

(10) Patent No.: US 8,676,702 B1
(45) Date of Patent: Mar. 18, 2014

(54) METHOD AND APPARATUS FOR GENERATING A BILL IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 444 days.

(21) Appl. No.: 11/195,119

(22) Filed: Aug. 2, 2005

(51) Int. Cl.
*G06Q 40/00* (2012.01)

(52) U.S. Cl.
USPC .................................. 705/40; 705/35; 705/39

(58) Field of Classification Search
USPC .......................................... 705/35, 38, 39, 40
See application file for complete search history.

(56) References Cited

U.S. PATENT DOCUMENTS

| | | | | |
|---|---|---|---|---|
| 6,996,542 | B1 * | 2/2006 | Landry | 705/40 |
| 7,702,579 | B2 * | 4/2010 | Neely et al. | 705/40 |
| 7,881,962 | B2 * | 2/2011 | Mason | 705/14.1 |
| 2003/0220863 | A1 * | 11/2003 | Holm et al. | 705/37 |

* cited by examiner

*Primary Examiner* — Lalita M Hamilton

(57) ABSTRACT

A method and apparatus for generating at least one bill in a packet network is described. In one embodiment, a request to change a billing cycle is received by an application server from a customer via a packet network. The billing cycle is subsequently changed to a modified billing cycle in accordance to the received request. Lastly, at least one bill is generated by the application server in accordance with the modified billing cycle.

14 Claims, 4 Drawing Sheets

METHOD AND APPARATUS FOR GENERATING A BILL IN A PACKET NETWORK

BACKGROUND OF THE INVENTION

1. Field of the Invention

Embodiments of the present invention generally relate to telecommunications systems and, more particularly, to a method and apparatus for generating at least one bill in a packet network.

2. Description of the Related Art

Large corporations normally follow various unique fiscal periods and accounting schedules. Due to the nature and markets of their respective businesses, each enterprise customer may desire to settle accounts with service (or goods) providers at a different time that is provided with the default (e.g., monthly) billing cycle. For example, an enterprise customer in one country may desire to invoice all of their accounts in the middle of the month, whereas a similar customer in another country may need to settle their accounts by the first Monday of each month. An enterprise customer does not have a convenient means to request and modify the frequency in which they are billed.

Thus, there is a need in the art for a method and apparatus for generating a bill in a packet network.

SUMMARY OF THE INVENTION

In one embodiment, a method and apparatus for generating at least one bill in a packet network is described. More specifically, a request to change a billing cycle is received by an application server from a customer via a packet network. The billing cycle is dynamically changed to a modified billing cycle in accordance to the received request. In turn, at least one bill is generated by the application server in accordance with the modified billing cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
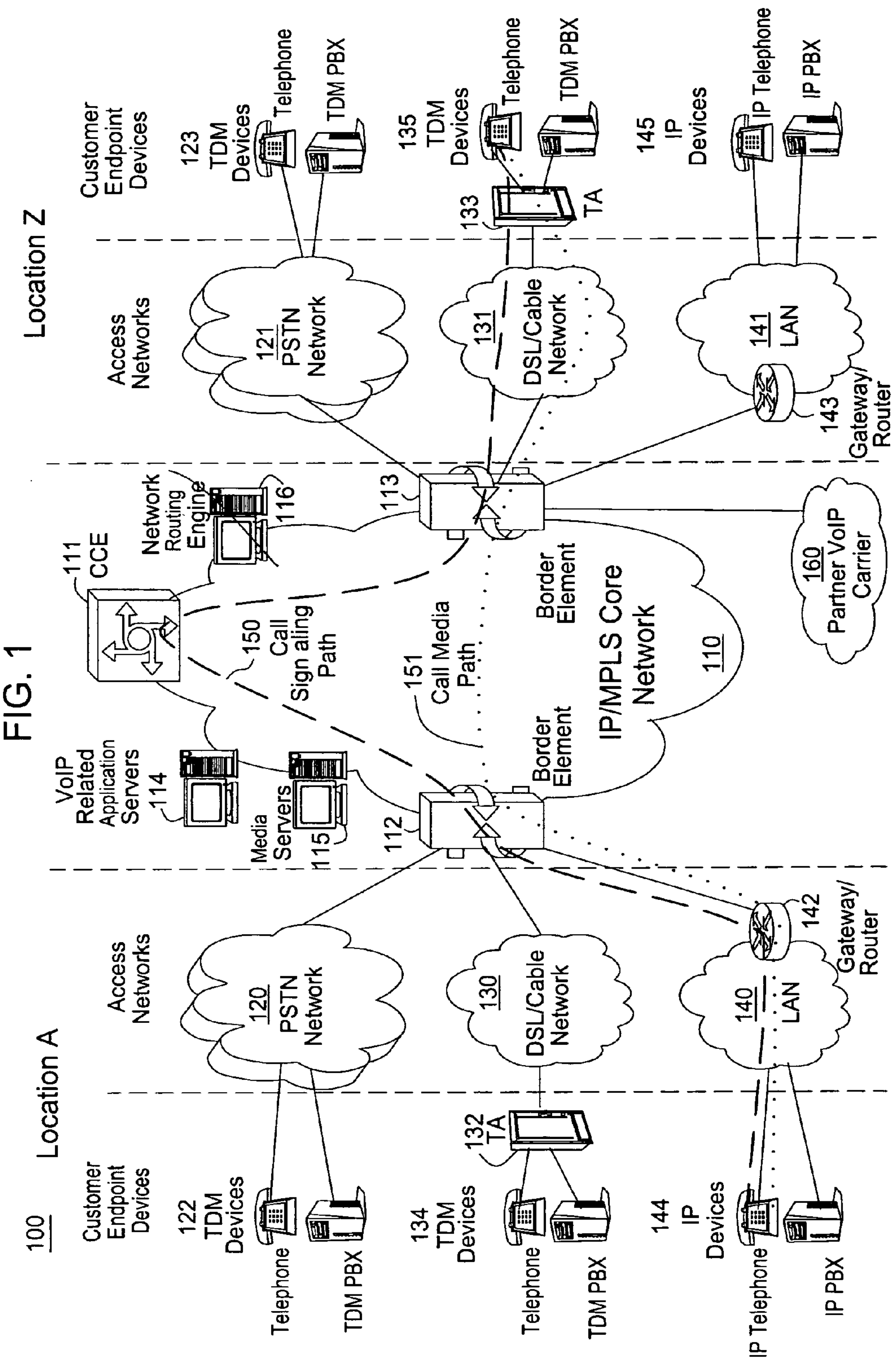
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
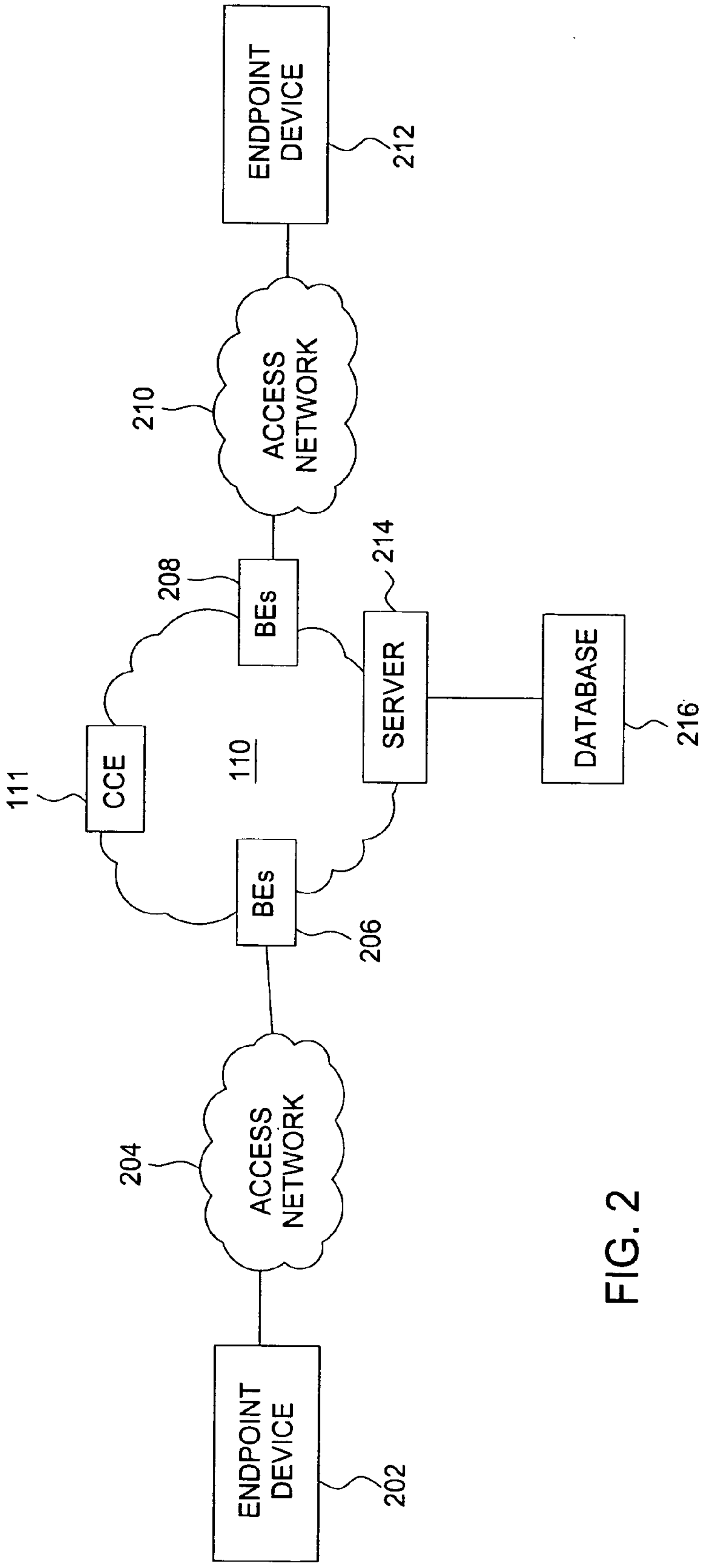
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 further includes a server 214 in communication with a database 216. In one embodiment of the present invention, the server 214 comprises a dedicated application server that is configured to receive billing cycle modification requests from an endpoint device or computer. Notably, the server 214 is configured to receive requests from a variety of endpoint devices, such as a telephone, IP phone, personal computer, and the like. The server 214 is also responsible for modifying customer records within the database 216. The database 216 may be any type of electronic collection of data that is well known in the art. In one embodiment, the database 216 stores data associated with a plurality of customers such as an identifier (e.g., identification number or name), registered services, current billing cycle, and the like.

In one embodiment of the present invention, an enterprise customer receives dynamically generated telecommunication bills from a network service provider (e.g., VoIP services) on a periodic basis, which is established by the customer, over an IP network. Notably, billing cycles may be modified selectively to a periodic basis, such as weekly, biweekly, or semi-annually, from a default billing cycle (e.g., monthly basis) per the request of the customer. Although default billing cycles are typically established during the time a customer initially requests (or signs up for) service from the service provider, the default billing cycle may be spontaneously superceded based on the immediate needs or desire of the customer.

The present invention may also adjust the billing rate in response to the billing cycle frequency selected by the customer. For instance, if the customer selects a billing cycle with a greater frequency than the default billing cycle, the application server 214 may be configured to apply a discount to the customer's billing rate (e.g., in exchange for more frequent payments). Conversely, a service provider may permit a customer to designate less frequent billing cycle (e.g., a bill every 3 months) at the expense of a higher billing rate or percentage increase.

Once the billing cycle modification request is received via a packet network (e.g., IP network) and recorded by an application server 124, bills are then electronically generated in accordance with the billing cycles recorded in the database 216. Thus, this invention effectively allows customers to dynamically define the frequency their bills should be paid through the network as opposed to the service provider generating (and sending) a bill on a pre-specified date that instructs the customer when the bill balance is to be paid.

Figure 3:
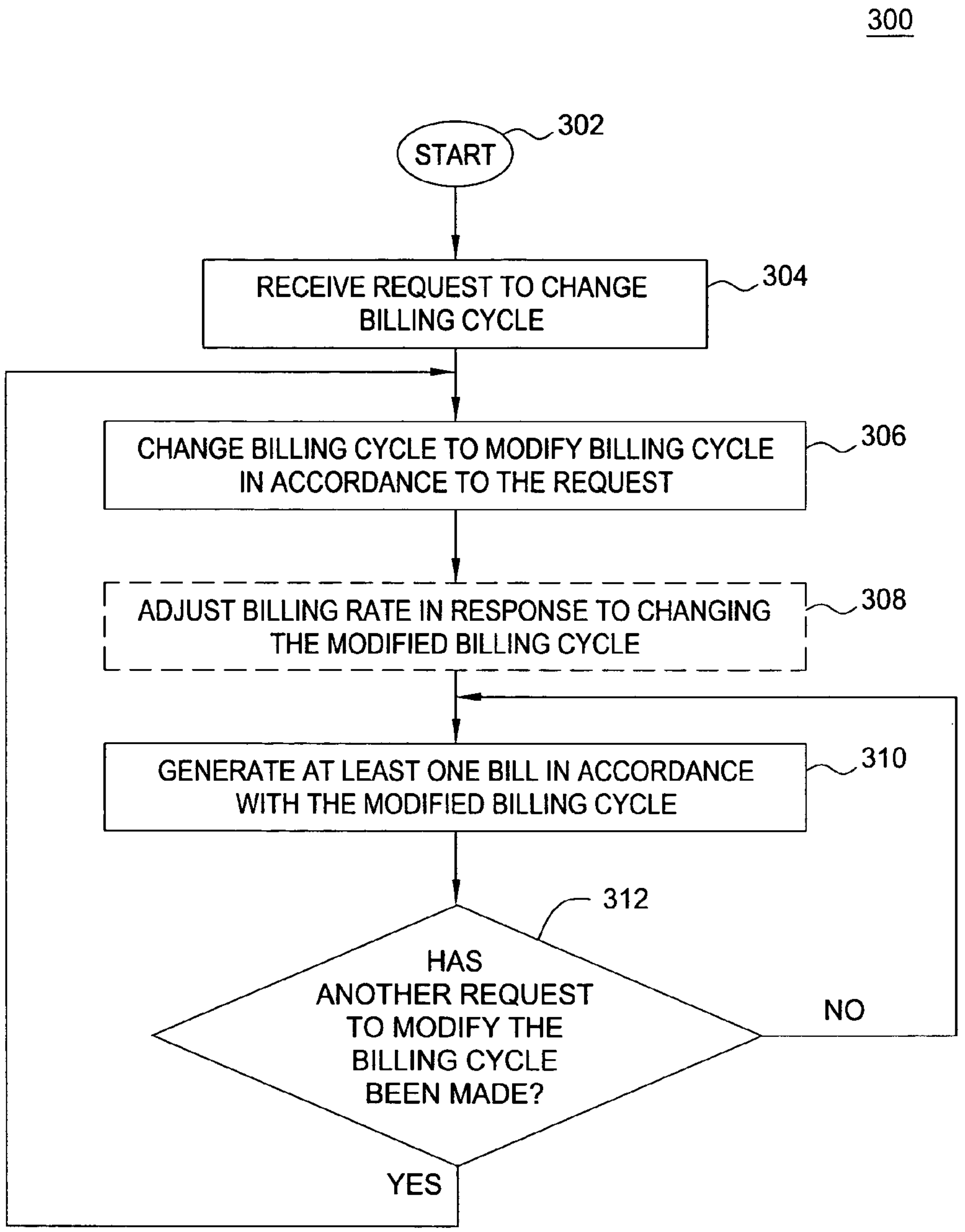
FIG. 3 is a flow diagram depicting an exemplary embodiment of a method for generating at least one bill in a packet network in accordance with one or more aspects of the invention.

FIG. 3 is a flow diagram depicting an exemplary embodiment of a method 300 for generating at least one bill via a packet network as related to one or more aspects of the invention. The method 300 begins at step 302 and proceeds to step 304 where a request for changing an existing billing cycle is received. In one embodiment, the existing billing cycle is a default billing cycle that is initially established by a service (or goods) provider when a new customer is registered or signed up. In one exemplary scenario, a new customer registers with a service provider for telecommunication services. The time and/or date that the new customer starts receiving service from the service provider determines when the bill for the services is due. Typically, this date is usually a specific day of the month for every month (e.g., the $14^{th}$ day of every month). However, the customer may feel that this particular schedule is inconvenient and may desire to change the billing cycle to one of greater frequency, e.g., a two week billing cycle. In order to grant this request, the service provider may permit the customer to utilize the present invention by using an endpoint device (e.g., endpoint device 202) to contact a certain customer care number and request a change to the existing billing cycle over a telephone interface (e.g., voice, keypad, etc.). In another embodiment, the endpoint device may be a computer, which may be used by a customer to make the billing cycle change request via the Internet (e.g., a web portal). In yet another embodiment, a customer may be required to utilize a password (or login) mechanism in order for the application server 124 to accept the billing cycle change request.

At step 306, the billing cycle is changed to a modified billing cycle in accordance to the request made in step 304. In one embodiment, the application server 124 changes the default billing cycle of a particular account to the requested modified billing cycle desired by a customer. Notably, the application server 124 may accomplish this task by modifying at least one entry of a database file 216 that corresponds to the customer making the request. Depending on the embodiment, the application server may be configured to change billing cycles via a telephone interface, Internet interface, or by some other telecommunications means.

At step 310, at least one bill is generated in accordance with the modified billing cycle. In one embodiment, the application server 214 generates at least one bill according to the new billing cycle that was established by the customer in step 306. Specifically, the application server 214 accesses database 216 and ascertains the appropriate date from a designated field. Depending on the embodiment, the generated bill may be electronically delivered (via the Internet) or conventionally mailed to the customer. The method 300 continues to step 312.

At step 312, an inquiry is made as to whether an additional request to change the existing modified billing cycle is received. In one embodiment, the application server is capable of receiving subsequent billing cycle requests from customers. If a new request has been made, then the method 300 loops back to step 306 and the billing cycle is modified once again. Conversely, if a subsequent request is not made, then the method 300 loops back to step 310 and at least one bill is generated in accordance to the current billing cycle.

In one embodiment, the method 300 may also include optional step 308 which involves adjusting a billing rate in response to the change in the billing cycle frequency. In one embodiment, the application server 214 modifies the database entry that corresponds to the billing rate of a particular customer after receiving the request. Depending on the embodiment, the application server may be configured to offer a discount on the services rendered to the customer if the frequency of the billing cycle is greater than one per month. This discount may be provided to the customer since the service provider will be able to obtain fees much more frequently. Alternatively, if a customer originally requested a billing cycle that was less frequent than a monthly billing cycle, then the service provider may be able to accommodate the customer in exchange for a reasonable billing rate increase.

Figure 4:
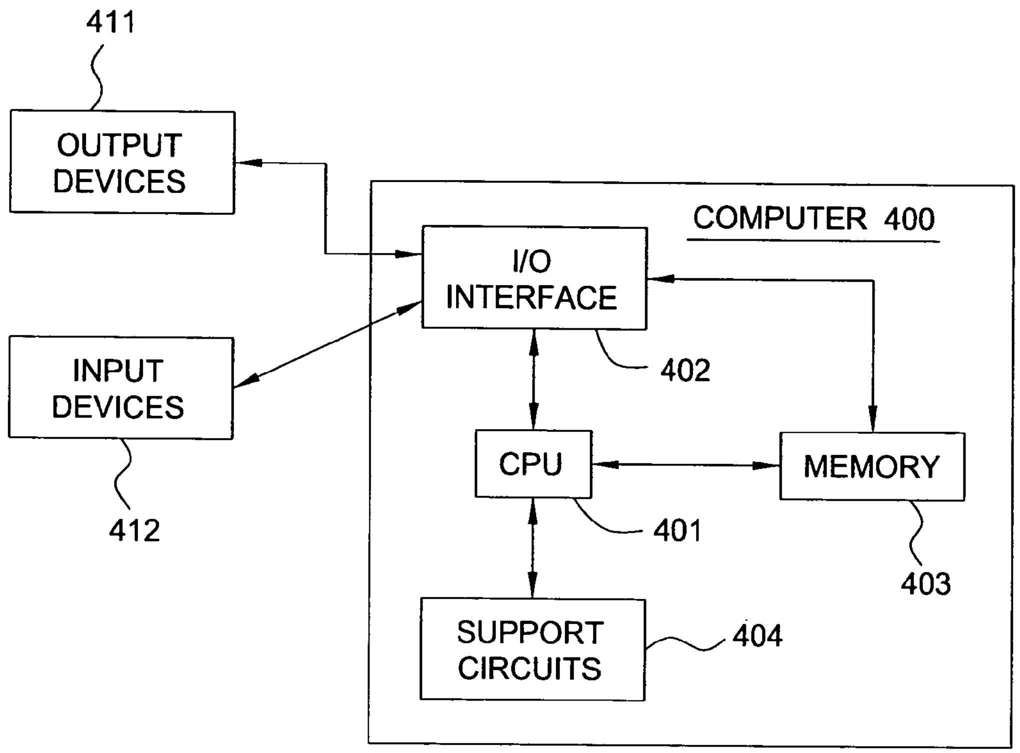
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 may be used to implement the server 214 of FIG. 2. The computer 400 includes a central processing unit (CPU) 401, a memory 403, various support circuits 404, and an I/O interlace 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Notably, the memory 403 may store bill generation software that is capable of modifying a billing cycle as well as generating an associated bill, as described above. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for generating a bill in a packet network, comprising:

receiving, by a processor, a request to change a default billing cycle from a customer, wherein the default billing cycle comprises a first periodic frequency that the bill is generated;

changing, by the processor, the default billing cycle to a modified billing cycle in accordance with the request, wherein the modified billing cycle comprises a second periodic frequency that the bill is generated different from the first periodic frequency, wherein the modified billing cycle is based on a number of weeks;

generating, by the processor, the bill in accordance with the modified billing cycle; and adjusting, by the processor, a billing rate for each subsequent bill that is generated at the modified billing cycle in response to the changing of the default billing cycle to the modified billing cycle, wherein the adjusting comprises discounting the billing rate if the modified billing cycle comprises a greater frequency than the billing cycle and increasing the billing rate if the modified cycle comprises a lower frequency than the billing cycle.

2. The method of claim 1, wherein the packet network comprises an internet protocol network.

3. The method of claim 2, wherein the internet protocol network comprises a voice over internet protocol network.

4. The method of claim 3, wherein the internet protocol network comprises a service over internet protocol network.

5. The method of claim 1, wherein the number of weeks correlates to a biweekly basis.

6. The method of claim 1, wherein the number of weeks correlates to a monthly basis.

7. The method of claim 1, wherein the number of weeks correlates to a semi-annual basis.

8. The method of claim 1, wherein the number of weeks correlates to an annual basis.

9. An apparatus for generating a bill in a packet network, comprising:

a processor; and a computer-readable medium storing a plurality of instructions which, when executed by the processor, cause the processor to perform operations, the operations comprising:

receiving a request to change a default billing cycle from a customer, wherein the default billing cycle comprises a first periodic frequency that the bill is generated;

changing the default billing cycle to a modified billing cycle in accordance with the request, wherein the modified billing cycle comprises a second periodic frequency that the bill is generated different from the first periodic frequency, wherein the modified billing cycle is based on a number of weeks;

generating the bill in accordance with the modified billing cycle; and adjusting a billing rate for each subsequent bill that is generated at the modified billing cycle in response to the changing of the billing cycle to the modified billing cycle, wherein the adjusting comprises discounting the billing rate if the modified billing cycle comprises a greater frequency than the billing cycle and increasing the billing rate if the modified cycle comprises lower frequency than the billing cycle.

10. The apparatus of claim 9, wherein the packet network comprises an internet protocol network.

11. The apparatus of claim 9, wherein the number of weeks correlates to a biweekly basis.

12. A non-transitory computer readable medium storing instructions that, when executed by a processor, causes the processor to perform operations for generating a bill in a packet network, the operations comprising:

receiving a request to change a default billing cycle from a customer, wherein the default billing cycle comprises a first periodic frequency that the bill is generated;

changing the default billing cycle to a modified billing cycle in accordance with the request, wherein the modified billing cycle comprises a second periodic frequency that the bill is generated different from the first periodic frequency, wherein the modified billing cycle is based on a number of weeks;

generating the bill in accordance with the modified billing cycle; and adjusting a billing rate for each subsequent bill that is generated at the modified billing cycle in response to the changing of the billing cycle to the modified billing cycle, wherein the adjusting comprises discounting the billing rate if the modified billing cycle comprises a greater frequency than the billing cycle and increasing the billing rate if the modified cycle comprises lower frequency than the billing cycle.

13. The non-transitory computer readable medium of claim 12, wherein the packet network comprises an internet protocol network.

14. The non-transitory computer readable medium of claim 13, wherein the internet protocol network comprises a voice over internet protocol network.

* * * * *